Nov. 26, 1968  R. S. RADOMSKI ET AL  3,413,427
DIRECTION SIGNAL SWITCH INCORPORATING WINDSHIELD WIPER
AND WASHER OPERATING MECHANISM
Filed Feb. 23, 1965  3 Sheets-Sheet 1

INVENTORS.
RICHARD S. RADOMSKI
ROBERT A. VERHAEGHE
BY
Learman & McCulloch
ATTORNEYS

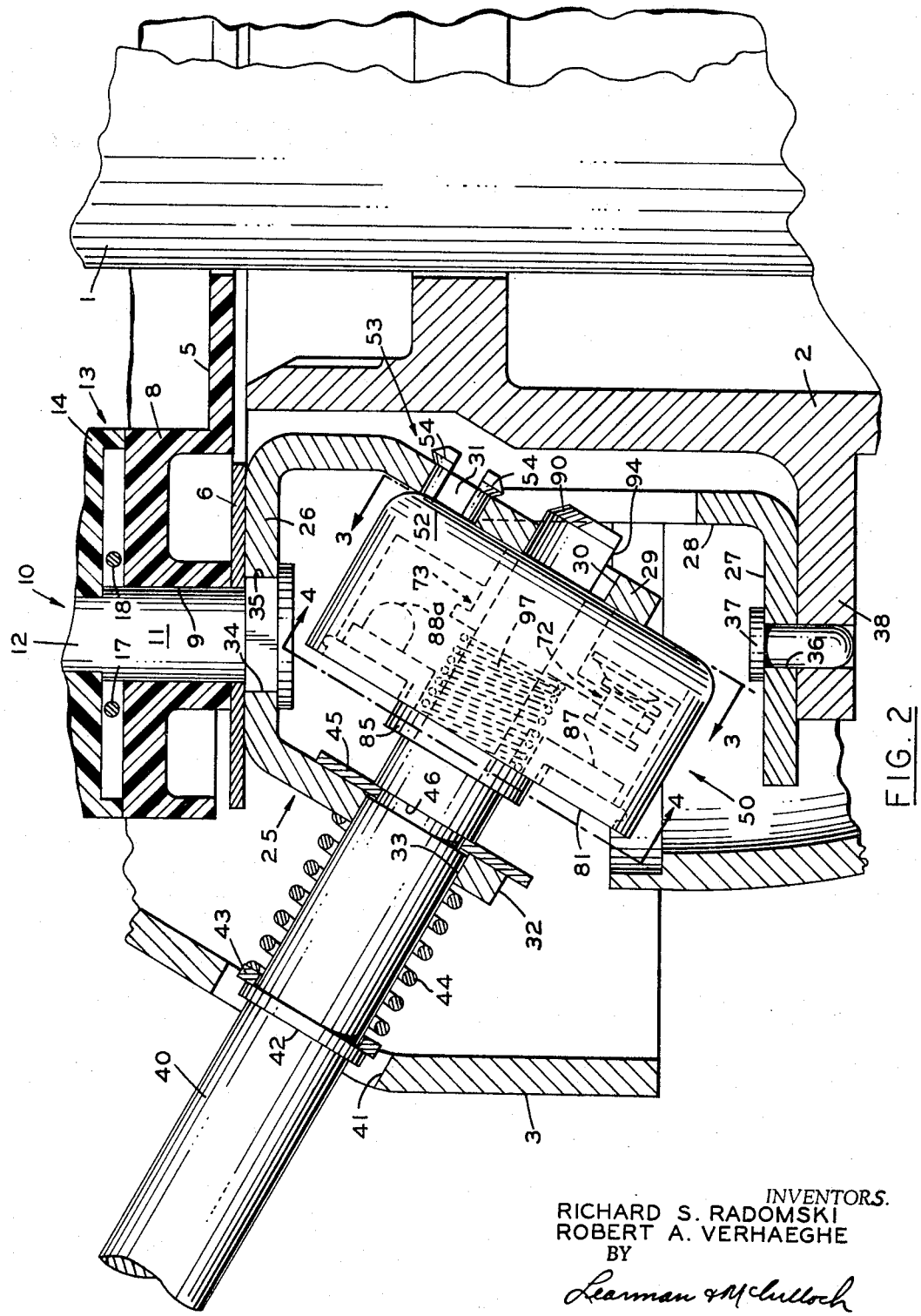

Nov. 26, 1968   R. S. RADOMSKI ET AL   3,413,427
DIRECTION SIGNAL SWITCH INCORPORATING WINDSHIELD WIPER
AND WASHER OPERATING MECHANISM
Filed Feb. 23, 1965                              3 Sheets-Sheet 3
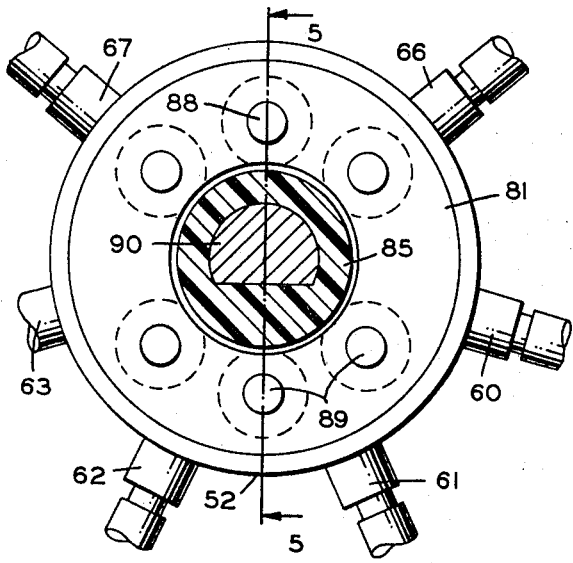
FIG. 4
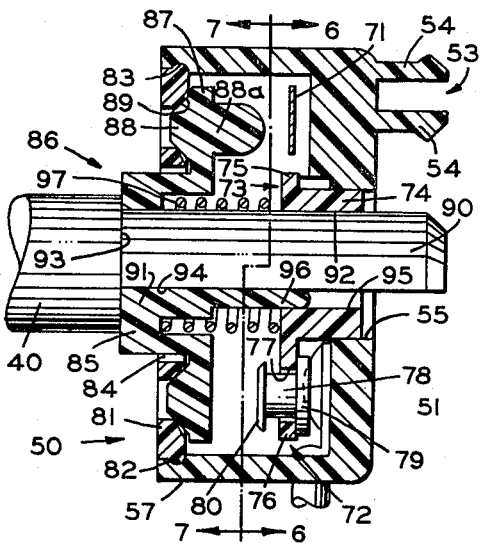
FIG. 5
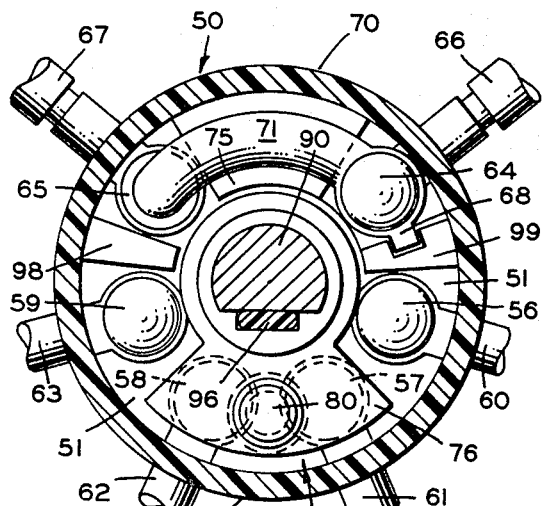
FIG. 6
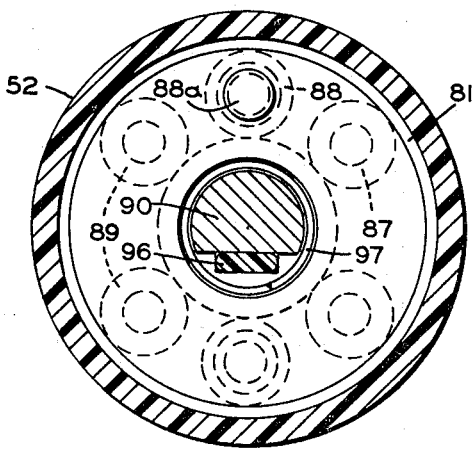
FIG. 7
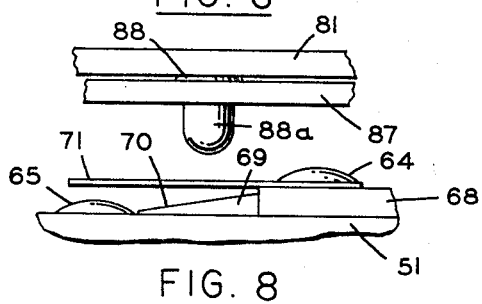
FIG. 8
FIG. 9
INVENTORS
RICHARD S. RADOMSKI
ROBERT A. VERHAEGHE
BY
Learman & McCulloch
ATTORNEYS

United States Patent Office 3,413,427
Patented Nov. 26, 1968

3,413,427
DIRECTION SIGNAL SWITCH INCORPORATING WINDSHIELD WIPER AND WASHER OPERATING MECHANISM
Richard S. Radomski and Robert A. Verhaeghe, Warren, Mich., assignors, by mesne assignments, to Essex Wire Corporation, Fort Wayne, Ind., a corporation of Michigan
Filed Feb. 23, 1965, Ser. No. 434,391
13 Claims. (Cl. 200—61.34)

ABSTRACT OF THE DISCLOSURE

A direction signal switch mechanism having oscillatable switching elements for indicating selectively a left-hand or right-hand turn in response to left or right rocking of an actuating lever, the actuating lever being rotatable about its own axis and having rotatable switch means for energizing and deenergizing a windshield wiper mechanism. The actuating lever also is axially reciprocable for operating a windshield washer mechanism having switch contacts located in the path of reciprocation of the lever.

---

This invention relates to an electric switch construction and more particularly to an assembly of switches any of which may be operated independently of or in conjunction with the others and by the same actuator.

Automotive vehicles conventionally include direction signals which are operated in response to actuation of a lever mounted on the vehicle's steering column. Such vehicles also conventionally include windshield wipers operated by an actuator mounted on the vehicle's dashboard. It also is fairly common for vehicles to include a windshield washing mechanism that is operated by a switch or other device which may or may not be proximate the windshield wiper actuator.

An object of this invention is to provide a switch construction wherein a vehicle's windshield wiper mechanism and windshield washer mechanism, or either of such mechanisms, may be incorporated in and operated by the vehicle's direction signal actuating mechanism.

Another object of the invention is to provide a switch construction of the kind referred to wherein any and all of the mechanisms to be operated may be operated independently or simultaneously.

A further object of the invention is to provide a switch construction which is capable of compensating automatically for imperfect manufacture or assembly of the component parts.

Another object of the invention is to provide a switch assembly including self-contained latching characteristics for releasably maintaining selected parts in any selected one of a number of different positions.

A further object of the invention is to provide an assembly of switches of the character referred to above and which lends itself to miniaturization so as to be capable of being accommodated in the limited space available within a vehicle's steering column.

Another object of the invention is to provide such a switch construction as has been described and which provides for wiping of the electrical contacts so as to assure good electrical operation and longevity.

A further object of the invention is to provide a switch construction composed of relatively few parts of simple assembly.

Other objects and advantages of the invention will be pointed out specifically or will become apparent from the following description when it is considered in conjunction with the appended claims and the accompanying drawings, in which:

FIGURE 2 is an enlarged, transverse sectional view taken along the line 2—2 of FIGURE 1;

FIGURE 4 is a sectional view taken on the line 4—4 of FIGURE 2;

FIGURE 5 is a transverse sectional view taken on the line 5—5 of FIGURE 4;

FIGURE 6 is a sectional view taken on the line 6—6 of FIGURE 5;

FIGURE 7 is a sectional view taken on the line 7—7 of FIGURE 5;

FIGURE 8 is a fragmentary, elevational view of a portion of the apparatus; and

FIGURE 9 is a fragmentary, sectional view of another portion of the apparatus.

Figure 1:
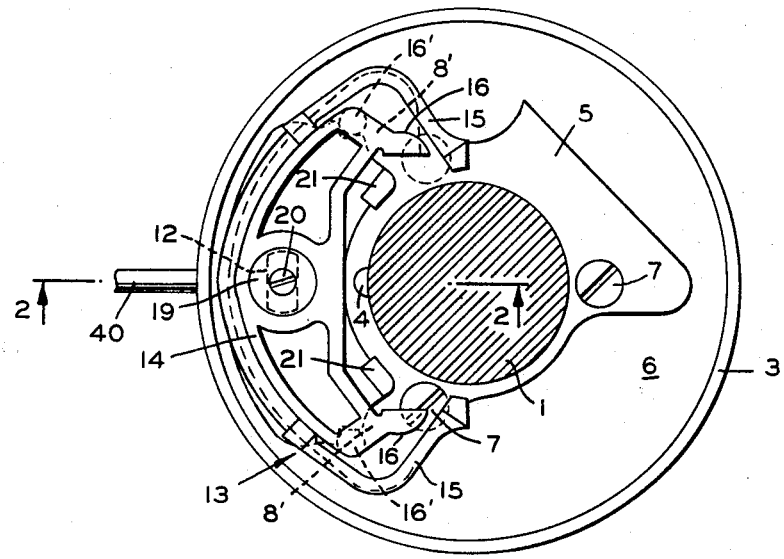
FIGURE 1 is a fragmentary, top plan view of a steering column within which is mounted a direction signal operating mechanism and through which extends a steering shaft, the shaft being shown in section.
Figure 3:
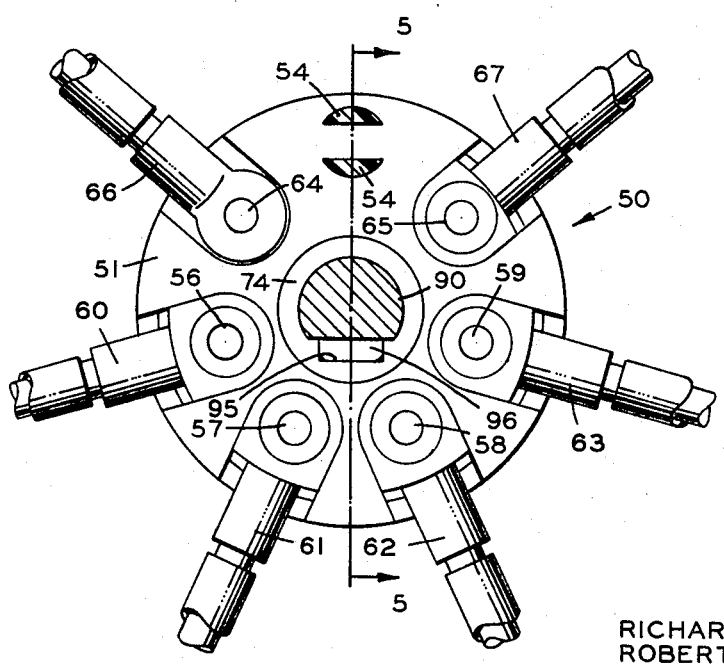
FIGURE 3 is a sectional view taken on the line 3—3 of FIGURE 2.

Apparatus constructed in accordance with the invention is adapted for use in conjunction with a vehicle having a rotatable steering shaft 1 which extends through a tubular sleeve 2 to the upper end of which is secured in any suitable manner an annular housing 3. In practice, the housing is located just below the vehicle's steering wheel (not shown). The shaft 1 may be provided with one or more cams 4 which rotate with the shaft and which are capable of initiating cancelling of direction signals.

Direction signal operating apparatus may comprise any one of a number of manually actuated, automatically cancelled devices, but for purposes of illustration direction signal operating apparatus as disclosed herein preferably comprises apparatus as disclosed in Patent No. 2,999,911 or in application Ser. No. 131,243, filed Aug. 14, 1961, now Patent No 3,171,910, and to which reference may be had for a more detailed description. Briefly, however, the direction signal operating apparatus comprises a base 5 which surrounds the shaft 1 and is secured to a mounting ring or flange 6 by suitable means such as screws 7. Formed integrally with the base 5 is a support or casing 8 on which a plurality of electrically conductive contacts (not shown) are mounted for connection to the direction signaling lamps of the vehicle. The support 8 is provided with a centrally located, cylindrical opening 9 through which extends a headed pivot post 10 having a cylindrical portion 11 received in the opening 9 and terminating at its upper end, as viewed in FIGURES 1 and 2, in a generally rectangular portion 12.

Mounted on the support 8 is an oscillatable direction signal operating member 13 having a generally arcuate body 14 terminating at each of its ends in a flexible finger 15, the free end of which projects toward the path of rotation of the cam 4. At each end of the body 14 is an abutment 16 that is adapted to be engaged by its asociated finger 15 under certain conditions subsequently to be described. At each end of the body 14 is a post or stud 16′ which cooperates with a cam or detent surface 8′ at each end of the support 8 and yieldably maintains the member 13 in any selected position of angular adjustment. Between the members 8 and 14 and connected to the later for oscillation therewith is a pair of electrically conductive switch members 17 and 18 (see FIGURE 2) which are adapted to bridge selected contacts carried by the base 8 so as to effect flashing of the direction signal lamps.

The rectangular portion 12 of the post 10 is received in a correspondingly shaped opening formed in the body 14 and is prevented from disassembly from the body by a washer 19 and a screw 20. The arrangement is such that rocking of the post 10 by means yet to be described in either one of two directions from the position shown in FIGURE 1 will cause corresponding rocking or oscillation of the direction signal operating member 13 an amount sufficient to project one of the fingers 15 in the path of rotation of the cam 4. Rocking movement of the member 13 is limited in either direction from the position shown in FIGURE 1 by stops 21 fixed to the support 8 and located in the path of movement of the member 14. In either of the operating positions of the operating body, the appropriate set of direction signaling lamps will be flashed. When the steering shaft 1 is rotated in the appropriate direction, the cam 4 will engage the finger 15 which lies in the path of the cam, whereupon the finger 15 will be forced against the associated projection 16 and return the operating member 13 to its neutral posiltion.

Means mounting the direction switch operating member 13 for oscillating movements comprises a frame 25 (FIGURE 2) having spaced apart, substantially parallel legs 26 and 27 joined at corresponding ends by a web 28. A tongue 29 is struck out from the plane of the web 28 and is provided with a pair of spaced apart openings 30 and 31. The opposite end of the leg 26 terminates in a flange 32 which is spaced from but substantially parallel to the tongue 29. The flange 32 is provided with an opening 33 coaxial with the opening 30. The leg 26 is provided with an opening 34 which accommodates an enlarged, flattened portion 35 of the post 10, and the frame leg 27 is provided with a coaxial opening 36 for reception of a pivot pin 37, the latter also being pivotally accommodated in an opening formed in a flange 38 fixed on the sleeve 2. The construction and arrangement of the frame 25 are such that the latter is oscillatable about an axis extending through the pins 10 and 37, and oscillation of the frame 25 effects conjoint rocking of the pin 10 and the direction signal operating member 13.

Means for oscillating the frame 25 and the direction switch operating member 13 comprises an actuator handle 40 which is slidably received in the openings 30 and 33 of the frame 25 and which projects through an elongated slot 41 formed in the housing 3 so as to be manually manipulatable by the driver of the vehicle. Between its ends, the handle 40 is provided with an annular flange 42 against which bears a washer 43. Between the washer 43 and the flange 32 is a compression spring 44 which constantly urges the handle 40 to an outwardly projected position. Outward movement of the handle 40 is limited by a snap ring 45 that is received in a groove 46 formed in the handle and which is adapted to bear against the inner surface of the flange 32.

The handle 40 not only is mounted in the frame 25 for reciprocation longitudinally of its axis but also is capable of rotation about its own axis for a purpose presently to be described.

Mounted on the frame 25 and interposed between the tongue 29 and the flange 32 is a generally cylindrical, hollow support or housing 50 having a base 51 and an annular side wall 52 formed of a suitable nonconductive material such as nylon. Projecting from the base 51 is an anchor device 53 comprising a pair of flexible, hook-shaped legs 54 that are adapted to enter the opening 31 and releasably anchor the housing 50 to the frame 25. The base 51 also is provided with a centrally located, cylindrical opening 55 which is larger than but concentric with the opening 30 in the tongue 29.

Secured to the inner surface of the base 51 is a group of four arcuately spaced, electrically conductive contacts 56, 57, 58, and 59, all of which are located at substantially the same level. To the contacts 56, 57, 58, and 59 are connected conductors 60, 61, 62, and 63, respectively, which may be joined to terminals of an electric windshield wiper mechanism (not shown). A second group of two arcuately spaced, electrically conductive contacts 64 and 65 also is secured to the inner surface of the base 51 and may be joined by conductors 66 and 67, respectively, to an electrically actuated windshield washer mechanism (not shown). The contact 64 is mounted on an enlarged part 68 of the base 51 so as to be located at a higher level than the contact 65, as is best shown in FIGURE 8. Between the contacts 64 and 65 is a ramp 69 having a surface 70 which slopes toward the level of the contact 65. Anchored to the contact 64 is an arcuate bridging member 71 formed of flexible, conductive material and which normally overlies but is free from engagement with the contact 65.

Rotatably journaled in the base 51 is a rotor 73 formed of nonconductive material such as nylon and having a hub 74 received in the opening 55. The inner end of the hub 74 terminates in a radial flange 75 having a segmental enlargement 76 which projects radially toward the annular wall 52 a distance sufficient to overlie any of the contacts 56–59. The flange 76 is provided with an opening 77 that is adapted to receive the shank 78 of an electrically conductive contact 72 having a head 79 of such size as to be capable of spanning and engaging any adjacent two of the contacts 56–59 and having an upset flange 80 at its opposite end of larger diameter than the opening 77 so as to prevent inadvertent separation of the contact from the flange 76. As is best shown in FIGURES 5 and 9, the diameter of the opening 77 is greater than the diameter of the shank 78, thereby enabling the contact 72 to slide and be substantially universally movable relatively to the flange 76. The contact 72 thus is capable of adjusting itself to the level of the several contacts 56–59 as the rotor 73 is rotated.

The end of the support member 50 opposite the base 51 normally is closed by an annular cover 81 formed of insulating material of the kind referred to earlier and having a peripheral rib 82 that is adapted to be snapped into an annular groove 83 formed in the wall 52 adjacent its free end. The cover 81 has a central opening 84 in which is rotatably received the hub 85 of an annular operating member 86. The member 86 includes an annular flange 87 which is received within the housing 50 inwardly of the cover 81. The surface of the flange 87 which confronts the cover 81 is provided with a plurality of generally frustoconical, angularly spaced projections 88 which are removably accommodated in correspondingly spaced, complementally shaped recesses 89 formed in the cover 81. The parts 88 and 89 constitute cooperable latch or detent means for a purpose presently to be explained. The opposite surface of the flange 87 is provided with a projection or stud 88a which extends toward the base 51.

The actuator handle 40 is adapted to be utilized not only to effect operation of the direction signaling apparatus, but also is intended to effect operation of the two switch means incorporated in the housing 50. To accomplish the latter objective, the inner terminal end 90 of the handle 40 is reduced so as slideably to pass through openings 91 and 92 formed in the member 86 and in the rotor 73, respectively. Between the handle 40 and the reduced end 90 is a shoulder 93 which bears against the hub 85 of the operating member 86. The reduced end 90 of the handle is provided with a flat surface 94 and the opening 91 in the hub 85 is complementally shaped so that rotation of the shaft 40 will cause corresponding rotation of the carrier 86. The opening 92 in the hub of the rotor 73 also includes a flat surface 95 which is spaced from the flat surface 94 of the handle portion 90. In this space is slideably accommodated a projection or key 96 integrally formed on the member 86, the arrangement being such that rotation of the member 86 is transmitted to the rotor 73 by the key 96.

The rotor 73 and the member 86 constantly are urged apart or away from one another by a compression spring 97 which surrounds the handle end 90 and the key 96 and has its opposite ends seated on the members 73 and 86, respectively. The spring 97 thus urges the latch projections 88 on the member 86 toward the latch recesses 89, and constantly urges the bridging contact 72 toward the level of the contacts 56–59.

When the parts of the apparatus are assembled in the manner disclosed in FIGURE 2, any one or all of the three switches may be actuated by manipulation of the actuating handle 40. When the switches are in their neutral or inactive positions, the handle 40 will be centered with respect to the slot 41 in the housing 3, and the direction signal operating member 13 will be in the neutral position shown in FIGURE 1. The rotor 73 will be in such position that the bridging contact 79 bridges and engages the contacts 58 and 59, and the operating member 86 will be in such position that the projection 88a overlies but is spaced from the contact 64. In these positions of the parts, the direction signals of the vehicle will be inactive and, if the contacts 58 and 59 are connected to the appropriate terminals of the windshield wiper mechanism, the wiper blades will be in their inactive or parked position. Moreover, since the projection is spaced from the contact 64, the washer mechanism will be inactive.

When the operating member 86 is in its neutral position, axial movement of the handle 40 in such direction as to cause the shoulder 93 to move the carrier 86 toward the rotor 73 will cause the projection 88a, to engage the contact 64, but such engagement will not effect deflection of the bridging member 71 into engagement with the contact 65. Thus, the windshield washer mechanism cannot be activated as long as the operating member remains in its neutral position.

When it is desired to operate the direction signal lamps, the handle 40 may be moved either clockwise or counterclockwise from the position shown in FIGURE 1, whereupon the operating member 13 will move in the corresponding direction and effect flashing of the appropriate direction signals. Such movement of the operating handle 40 also effects corresponding movement of the frame 25, but does not effect any relative change in the positions of the switch parts accommodated in the support member 50.

When it is desired to effect operation of the windshield wipers, the handle 40 may be rotated about its own axis in a counterclockwise direction, as viewed in FIGURE 6, so as to cause corresponding rotation of the member 86 which, in turn, effects rotation of the bridging contact 72 to a position in which it bridges and engages the contacts 57 and 58. If the contacts 57 and 58 are connected to the terminals of the windshield wiper mechanism which drive the wipers at either a slow or fast rate of speed, the wipers will move accordingly.

During rotation of the member 86, the yieldability of the spring 97 permits axial movement of the member 86 an amount sufficient to disengage the interengaged latch parts 88 and 89 during rotation, but the spring will return the member 86 into latched relationship when the moving projections 88 become aligned with the next group of openings 89.

When the members 73 and 86 are in the positions shown in FIGURES 7 and 8, the projection 88a will be in a position midway between the contacts 64 and 65. Axial displacement of the handle 40 an amount sufficient to effect engagement between the projection 88a and the member 71 will enable deflection of the latter an amount sufficient to engage the contact 65, whereupon a circuit may be completed through the contacts 64 and 65 to effect operation of the windshield washing mechanism. Preferably, the actuation of the washing mechanism will continue only so long as the handle 40 is held by the driver in its axially adjusted position. Upon release of the handle by the driver, the spring 44 will restore the handle 40 to its projected position and the spring 97 will restore the member 86 to the position shown in FIGURE 5.

Further counterclockwise rotation of the handle 40 from the position shown in FIGURE 6 will enable the bridging contact 72 to bridge the contacts 56 and 57, thereby enabling the windshield wipers to be driven at a different speed. In these positions of the apparatus, the projection 88a will overlie the contact 65, whereupon axial displacement of the handle 40 by the driver will enable the member 71 to deflect into engagement with the contact 65 and energize the windshield washer mechanism.

Rotation of the handle 40 clockwise from the position shown in FIGURE 6 will restore the switch parts to their neutral or inactive positions, thereby disabling the windshield wiper mechanism and making it impossible to actuate the washer mechanism. The extent of rotation of the handle 40 is determined by abutments 98 and 99 (see FIGURE 6) which lie in the path of rotation of the flange 76.

The circuit controlled by the rotor 73 can be operated in any position of the direction signal operating mechanism and independently of the latter. In the disclosed embodiment the circuit controlled by the member 71 can be operated in any two of the three positions of the operating member 86, and independently of the direction signal operating mechanism, but it will be understood that the circuit controlled by the member 71 can be so constructed as to be operated in any position of the member 86 if desired.

The disclosed embodiment is representative of a presently preferred form of the invention, but is intended to be illustrative rather than definitive thereof. The invention is defined in the claims.

What is claimed is:

1. An electric switch construction comprising support means; a rotor member journaled on said support means for rotation; rotatable and slideable operating means keyed to said rotor member for rotating the latter; first detent means mounted on said operating means for rotation therewith; and second detent means on said support means engageable with and disengageable from said first detent means for releasably maintaining said operating means and said rotor member in selected positions of adjustment relative to said support means, said operating means being slideable axially of said rotor member toward and away from the latter.

2. The construction set forth in claim 1 including a switch operating member on said operating means, and switch means carried by said support means in the path of axial movement of said operating means for operation thereby.

3. An electric switch construction comprising support means; means mounting said support means for rocking movement about an axis; a plurality of spaced apart contacts carried by said support means; switch operating means; a flexible bridging member of such length as to bridge all of said contacts and interposed between said operating means and said contacts; means mounting said operating means for rotation about said axis and for rotation about a second axis and for axial movements toward and away from said bridging member for effecting engagement and disengagement of said operating means with and from said bridging member, engagement between said operating means and said bridging member effecting flexing of said bridging member; and actuating means for rotating and axially moving said operating means and for rocking said support means.

4. The construction set forth in claim 3 including engageable and disengageable detent means on said support means and said operating means for releasably maintaining the latter in a selected position of rotative adjustment.

5. The construction set forth in claim 3 including additional spaced apart contacts carried by said support means; rotor means; means connecting said actuating means to said rotor means for rotating the latter; and conductive means carried by said rotor means for engagement with selected ones of said additional contacts.

6. An electric switch construction comprising a support member; a rotor journaled on said support member for rotation; a plurality of spaced contacts on said support member; a bridging contact; means mounting said bridging contact on said rotor in overlying relation to said contacts for substantially universal movement relative to said rotor, said bridging contact being of such size as to bridge any adjacent pair of said contacts; actuating means connected to said rotor for rotating the later; and spring means acting on said rotor and urging the latter in a direction toward said contacts.

7. An electric switch construction comprising frame means oscillatable about a first axis; an actuator; means mounting said actuator on said frame means for oscillating the latter and for rotation of said actuator about its own axis; a support member carried by said frame means for oscillation therewith about said first axis; a rotor; engageable and disengageable switch means on said support member and said rotor; and means connecting said actuator to said rotor for rotating the latter in response to rotation of said actuator about its said axis to effect engagement and disengagement of said switch means.

8. The construction set forth in claim 7 including an oscillatable switch operating member; and means interconnecting said frame means and said switch operating member for oscillating the latter in response to oscillation of said frame means.

9. The construction set forth in claim 7 wherein said mounting means mounts said actuator for reciprocating movement longitudinally of said axis.

10. The construction set forth in claim 9 including a second operating member supported by said actuator for reciprocation therewith; and second engageable and disengageable switch means on one of said members engageable with and disengageable from one another in response to reciprocation of said second operating member.

11. An electric switch construction comprising oscillatable frame means; an actuator; means mounting said actuator on said frame means for oscillating the latter and for reciprocating movement relative to said frame means and for rotation about its own axis relative to said frame means; a support member; a rotor; engageable and disengageable first switch means on said support member and said rotor; means connecting said rotor to said actuator for rotation therewith to effect engagement and disengagement of said first switch means; an operating member; engageable and disengageable second switch means on one of said members; and means connecting said operating member to said actuator for reciprocating movements therewith to effect engagement and disengagement of said second switch means.

12. The construction set forth in claim 11 including oscillatable switch operating means; and means interconnecting said frame means and said switch operating means for oscillating the latter in response to oscillation of said frame means.

13. An electric switch construction comprising a support means; a rotor member journaled on said support means for rotation; operating means rotatably mounted on said support means; first detent means mounted on said operating means for rotation with the latter and keying said rotor member to said operating means for rotation therewith; and second detent means on said support means engageable with and disengageable from said first detent means for releasably maintaining said operating means and said rotor member in selected positions of adjustment relative to said support means.

References Cited
UNITED STATES PATENTS

| | | | |
|---|---|---|---|
| 3,254,168 | 5/1966 | Peterson | 200—61 |
| 3,238,316 | 3/1966 | Voss | 200—6 |
| 3,188,678 | 6/1965 | Mandy et al. | 200—4 X |
| 3,159,722 | 1/1964 | Cobb et al. | 200—11 |
| 3,145,700 | 8/1964 | Root | 200—44 X |
| 2,905,962 | 9/1959 | Zeigler | 200—4 X |
| 1,893,371 | 3/1933 | Knowlton | 200—6 |

BERNARD A. GILHEANY, *Primary Examiner.*

R. COHRS, *Assistant Examiner.*